(12) United States Patent
Henning et al.

(10) Patent No.: US 6,868,788 B2
(45) Date of Patent: Mar. 22, 2005

(54) METHOD AND DEVICE FOR UTILIZING THE WASTE HEAT THAT HAS ACCUMULATED DURING THE SUPPLY OF FORCED DRAUGHT/COMPRESSED AIR TO A PRINTING PRESS

(75) Inventors: Hans-Heinrich Henning, Ennepetal (DE); Bernhard Radermacher, Viersen (DE); Walter Winkelströter, Wuppertal (DE); Dirk Schäfer, Wuppertal (DE); Michael Werth, Wuppertal (DE); Wolfgang Mohr, Halstenbeck (DE)

(73) Assignees: Gebr. Becker GmbH & Co., Wuppertal (DE); ELTOSCH Torsten Schmidt GmbH, Hamburg (DE)

( * ) Notice: Subject to any disclaimer, the term of this patent is extended or adjusted under 35 U.S.C. 154(b) by 19 days.

(21) Appl. No.: 10/221,756

(22) PCT Filed: Mar. 15, 2001

(86) PCT No.: PCT/EP01/02888

§ 371 (c)(1),
(2), (4) Date: Jan. 10, 2003

(87) PCT Pub. No.: WO01/68223

PCT Pub. Date: Sep. 20, 2001

(65) Prior Publication Data

US 2004/0040459 A1 Mar. 4, 2004

(30) Foreign Application Priority Data

| Mar. 16, 2000 | (DE) | 100 12 930 |
| Apr. 19, 2000 | (DE) | 100 19 259 |
| May 19, 2000 | (DE) | 100 24 446 |
| Aug. 9, 2000 | (DE) | 100 38 802 |

(51) Int. Cl.[7] ............................................. B41F 23/04
(52) U.S. Cl. ...................................... 101/487; 101/483
(58) Field of Search .................................. 101/487, 488, 101/483, 484

(56) References Cited

U.S. PATENT DOCUMENTS

| 2,022,635 A | * | 11/1935 | Durham | 101/157 |
| 2,363,273 A | * | 11/1944 | Waterfill | 62/197 |
| 3,318,018 A | * | 5/1967 | Rodman et al. | 34/62 |
| 4,658,596 A | * | 4/1987 | Kuwahara | 62/197 |
| 5,582,020 A | * | 12/1996 | Scaringe et al. | 62/102 |
| 5,605,189 A | * | 2/1997 | Schlickhoff | 165/263 |
| 5,623,292 A | * | 4/1997 | Shrivastava et al. | 347/18 |
| 5,657,637 A | * | 8/1997 | Mertens | 62/175 |
| 5,720,221 A | * | 2/1998 | Harig et al. | 101/148 |
| 5,749,295 A | * | 5/1998 | Kurz | 101/350.1 |
| 5,974,813 A | * | 11/1999 | Jeong | 62/127 |
| 5,974,817 A | * | 11/1999 | Prummer | 62/238.6 |

FOREIGN PATENT DOCUMENTS

| DE | 29503245 | 4/1995 |
| DE | 19742827 | 4/1999 |
| DE | 29916575 | 12/1999 |
| DE | 20008740 | 8/2000 |

* cited by examiner

Primary Examiner—Anthony H. Nguyen
(74) Attorney, Agent, or Firm—Martin A. Farber

(57) ABSTRACT

A method of and installation for supplying suction/compressed air and drying air to a printing machine, whereby the vacuum pumps and compressors which are necessary for supplying the suction air/compressed air are disposed together in a room with a separate air supply, wherein to homogenize if required condition air without extra costs the cooling air for the vacuum pumps or compressors is conducted substantially in a circuit, and the heated exhaust air of the vacuum pumps and the heated cooling air of the vacuum pumps and compressors are cooled in a heat exchanger and used for heating separate drying air.

12 Claims, 2 Drawing Sheets

METHOD AND DEVICE FOR UTILIZING THE WASTE HEAT THAT HAS ACCUMULATED DURING THE SUPPLY OF FORCED DRAUGHT/COMPRESSED AIR TO A PRINTING PRESS

FIELD AND BACKGROUND OF THE INVENTION

The invention relates in the first instance to a method of using the waste heat which accumulates when suction air/compressed air is supplied to a printing machine, the subassemblies which produce the suction air and/or compressed air being disposed together in a room with a separate air supply.

Such air-supply arrangements for printing machines are known. It is also known for these to be disposed in a room with a separate air supply, although a large part of the necessary air is taken in from the surroundings, in particular also from the hall in which the printing machine is set up. It has also already been proposed for the subassemblies to be set up in a separate room outside the hall and to take in the corresponding quality of air from these surroundings.

The disadvantage in all cases, however, is that the air taken in does not always fulfill the criteria provided for the printing process, in view in particular of the paper used there. It is predominantly also the fluctuation in the air values (temperature, humidity) which is disadvantageous. If air is taken in from the printing-machine hall, this can be countered if all the air in the printing-machine hall is conditioned, i.e. prepared by temperature-conditioning. However, this involves very high outlay. If outside air is taken in, the fluctuations in the air values are usually even more pronounced. It is also possible here, however, since it is only for this taking-in operation but with even higher outlay, for conditioning in the sense of temperature-conditioning to be carried out.

SUMMARY OF THE INVENTION

A possible way is thus sought of achieving a certain homogenization, and as far as possible even conditioning, in particular of the process air for the printing machine, the intention nevertheless being, as far as possible, not to incur any additional costs, in particular any additional operating costs.

This object is achieved in that the heated waste air discharged after passing through the subassemblies and the cooling air is cooled by means of a heat exchanger/refrigerant, the refrigerant is then brought to a considerably higher temperature level, in order to increase the temperature, and, furthermore, air which is required for the drier is heated up in a second heat exchanger. This method, on the one hand, makes it possible, by virtue of the air which serves for supplying the compressors being cooled, to carry out a certain conditioning, if required, that is to say to cool, if necessary, to below the dew point of this air. On the other hand, however, the heat obtained in this way continues to be used, that is to say costs may be saved elsewhere, this being the case in respect of the drying air which is also necessary in a printing machine.

It is also pertinent that the cooling air for the subassemblies, i.e. the cooling air of the vacuum pumps and compressors, is conducted substantially in a circuit, the heated cooling air/circulating air conducted in the separate room is cooled in a heat exchanger and used for heating up separate drying air.

It is also important that the waste air is cooled to the extent where, in the case of undesirably high air humidity, dehumidification is achieved.

Furthermore, it is preferred for the heat extracted from the cooling air/circulating air to be transformed to a higher temperature level than corresponds to the temperature level of the waste air, in order to heat up the abovementioned drying air.

This transformation may be suitably carried out by means of a heat pump or a heat-pump process.

It is also particularly important that the cooling and transformation is carried out by means of a circulating refrigerant. Thus, on the one hand, the complete separation of the two circuits is ensured but, on the other hand, reliable transformation, precisely in the heat-pump process, is made possible.

For those periods of time in which, although the air for the vacuum pumps and compressors is cooled, no heat is removed on the drying-air side, it is also provided that, as an alternative to heating up the drying air (and the recooling achieved here), the refrigerant is routed via a separate recooler.

In respect of the drying air, it is necessary, beyond the heating which can be achieved by the abovementioned heat-pump heat exchange, for further heating to be provided. For this purpose, it is further preferred for a reheater to be disposed downstream of the heat exchanger heating up the drying air.

The invention also relates to an installation for supplying suction air, compressed air and drying air to a printing machine, having a separate room in which subassemblies are disposed.

In order to achieve a suitable but nevertheless cost-effective air supply, the invention proposes in apparatus terms, analogously to the method described for the invention, that a set-up for circulating-air operation is provided in the separate room, a first heat exchanger, connected into the circulating-air operation, is provided for cooling the circulating air, and a second heat exchanger is provided outside the separate room, for heating up the drying air, the first and the second heat exchangers being connected to one another via a refrigerant/heat-pump circuit.

Furthermore, as far as the installation is concerned, the invention also proposes the details which can further be gathered from the above description, for example that a branch to a recooling means is connected between the first and second heat exchangers.

It is also possible for a further heat exchanger to be inserted into the waste-air channel of the drying means.

It is also possible for the heat pump, at the same time, to use the waste heat of further heat sources, for example the heat sources provided by the ink-unit and damping-solution temperature control and, if appropriate, a varnish-cooling arrangement.

BRIEF DESCRIPTION OF THE DRAWINGS

Furthermore, the invention is explained hereinbelow with reference to the attached drawing, which nevertheless merely illustrates exemplary embodiments. In the drawing.

DETAILED DESCRIPTION OF THE PREFERRED EMBODIMENT

Figure 1:
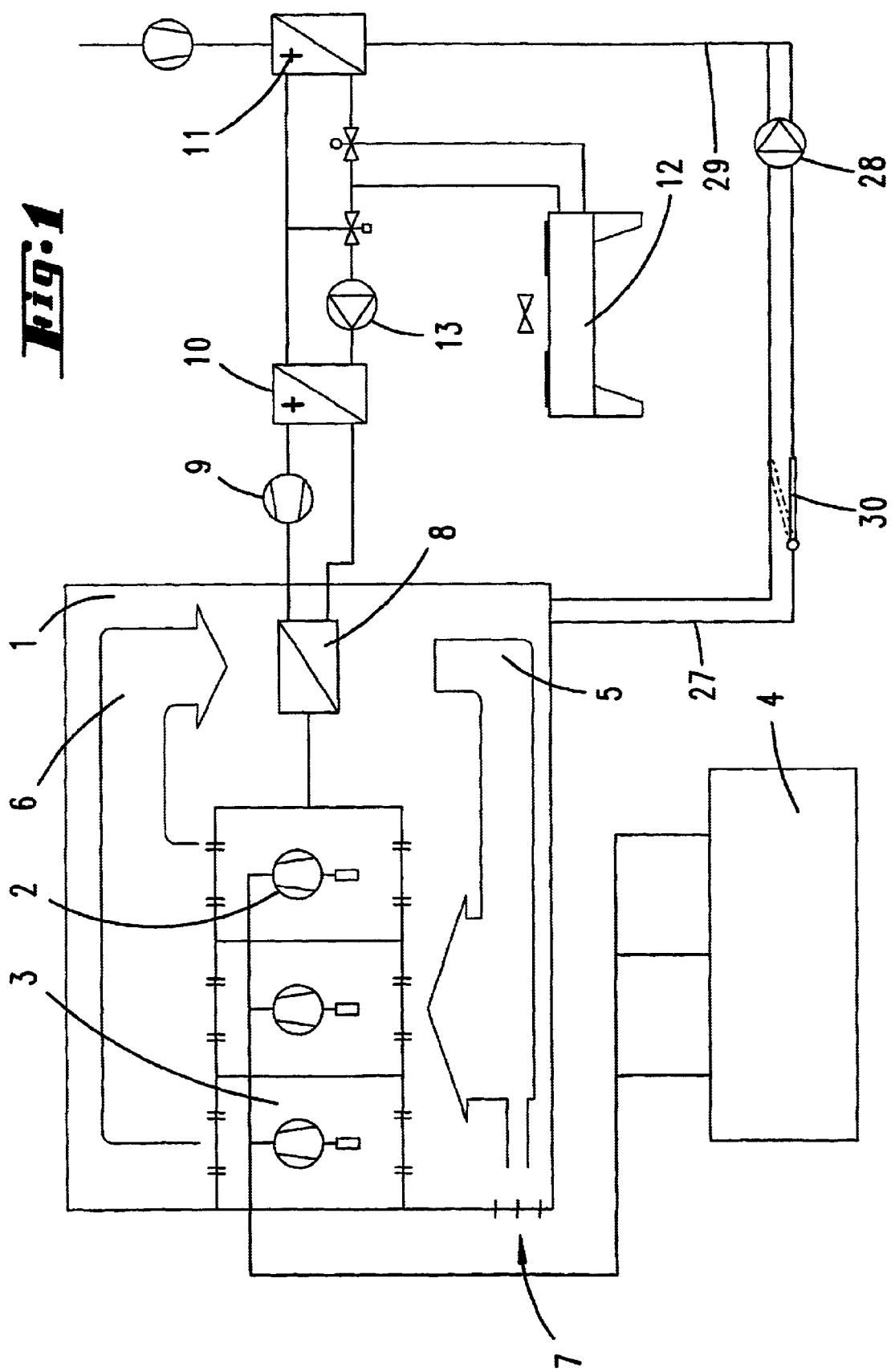
FIG. 1 shows a diagram of the installation for supplying a printing machine with drying air and suction/blowing air.

Illustrated and described, in the first instance with reference to FIG. 1, is a separate room 1 in which a plurality of compressors 2 and, if appropriate, vacuum pumps 3 are located for supplying a printing machine 4 with compressed air and a vacuum. The blower 2 is supplied with the necessary air predominantly by circulating-air operation, which is indicated by the arrows 5, 6. The separate housing, rather than being hermetically sealed, also has ambient openings 7, in order to balance the air supply.

The heated circulating air, which flows in accordance with the arrow 6, is routed through a heat exchanger 8, in which it is cooled by means of a refrigerant.

In the case of a practical application example, the cooling air leaves the vacuum pumps and compressors, by means of fans, at a temperature of approximately 30° C. and is cooled again to approximately 15° C. in the heat exchanger 8, this being the case for a quantity of air per fan/blower of approximately 2500 m$^3$ per hour, that is to say, for a practical application example with typically approximately four fans provided, in the case of an air flow of 10,000 m$^3$ per hour.

The heat-transporting medium is conducted in a circuit, where heat is extracted by means of a compressor 9, and is brought to a different temperature level, typically to the extent where a temperature of, for example, 70° C. is achieved. With a small temperature difference, the heat is passed to a heat-transporting medium and fed to a heat exchanger 11, in which the actual heating of the drying air takes place. For example, the drying air passes into the heat exchanger 11 at 20° C. and leaves it at 65° C.

In contrast to this diagram, it may also be provided that the heat-transporting medium between the heat exchangers 8 and 10, usually a refrigerant, is passed directly to the heat exchanger 11, so that the lines illustrated therebetween in FIG. 1 are thus dispensed with and/or the heat exchanger 11 is replaced by the heat exchanger 10.

The two heat exchangers 10 and 11, however, are usually indicated or necessary because provided between these heat exchangers is a connection to a recooler 12, in which recooling takes place in the operating phases in which drying air does not have to be heated up. The heat-transporting medium in the second circuit is circulated by means of a pump 13.

FIG. 1 further illustrates that it is possible to provide a connecting line 27, by means of which air is extracted from the room 1 by way of a suction blower 28 and can be fed into the line 29, through which the drying air flows. This has the advantage that the air, which is possibly dehumidified downstream of the heat exchanger 8, as has also already been explained in detail above, can be used as drying air or, as is usually the case, can be mixed with the drying air. It is thus advantageously possible to reduce the humidity content of the drying air. Furthermore, it is also possible to provide a bypass flap 30 in the line 27, in order, if appropriate, for ambient air to be added or for only ambient air to be taken in.

In respect of the possible removal of dry air from the room 1 or of air being dried by the heat exchanger 8 in the room 1 as such, it may also be provided, if necessary from the point of view of the operating states, that humidifying subassemblies are provided upstream of the compressors 2, in order for it to be possible for the blowing air to be conditioned, if appropriate, to a more humid setting. If appropriate, this may also be achieved, alternatively or in addition, with a bypass to the ambient air, with the result that some ambient air is taken in directly by way of the compressors, from outside the room 1.

Figure 2:
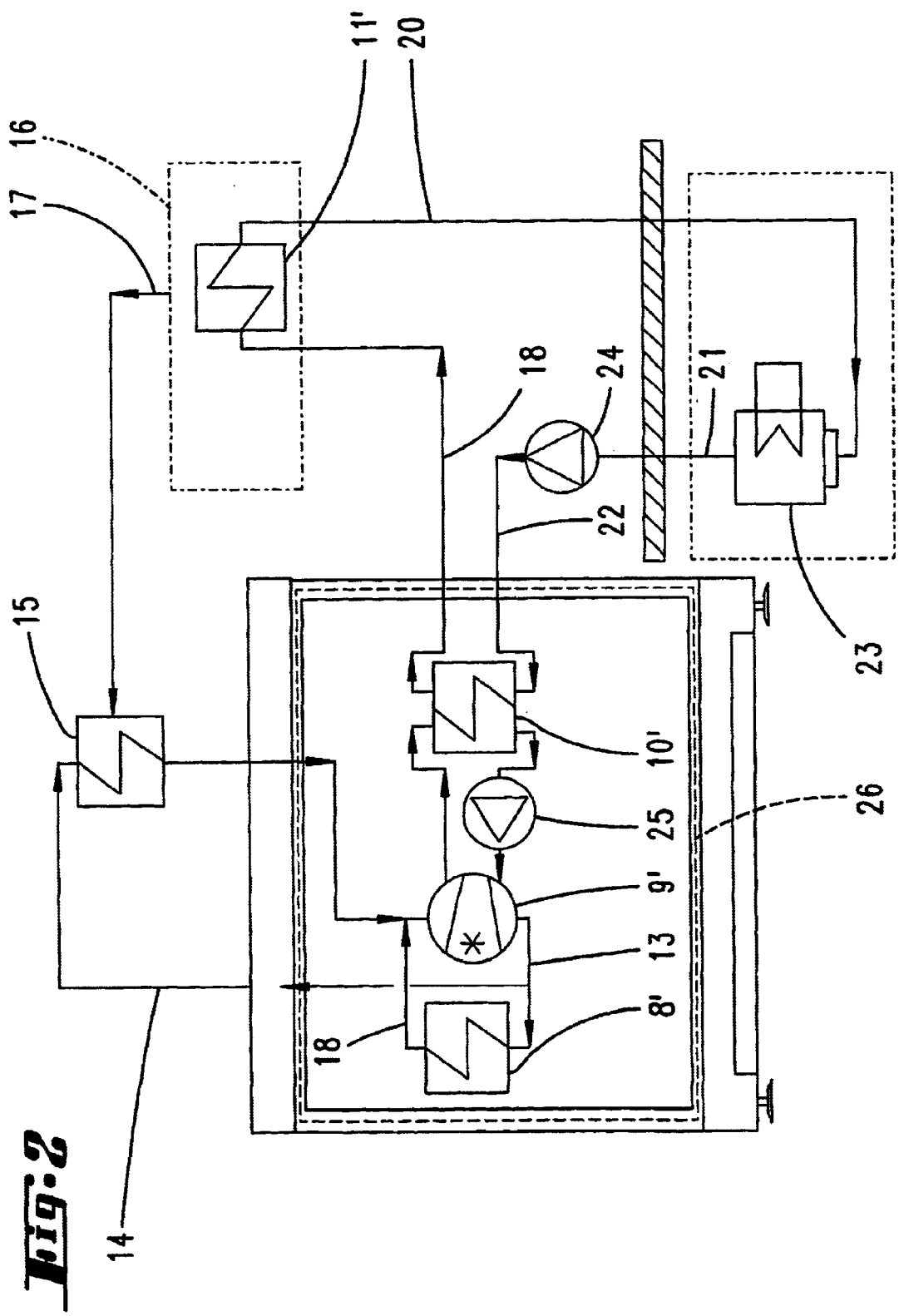
FIG. 2 shows a diagram which forms an addition, supplement and, in part, alternative to FIG. 1.

In the case of the installation diagram of FIG. 2, the heat exchanger 8' corresponds to the heat exchanger 8 according to FIG. 1 and the heat exchanger 11' corresponds to the heat exchanger 11 according to FIG. 1.

Furthermore, in the case of the installation diagram of FIG. 2, a cold compressor 9' and an intermediate heat exchanger 10' is also provided in a manner corresponding to FIG. 1. The following modifications and supplements are provided in addition:

A branch line 14, which leads to a heat exchanger 15, is connected in the return from the cold compressor 9' to the heat exchanger 8', the line 13. Air 17 flowing out of a printing-machine dryer 16 is cooled in the heat exchanger 15. The refrigerant heated in this way, in turn, is directed to the cold compressor 9' and, together with the refrigerant flowing out of the heat exchanger 8' following heating up, directed, in the line 18, to the cold compressor 9'. The refrigerant is also compressed in the cold compressor 9' in a manner corresponding to the method in the case of the installation diagram according to FIG. 1, and is thus heated, and fed to the heat exchanger 10' in the heated state. Here, the heat is transmitted to a heat-carrier medium, in this case a water/glycol mixture, flowing in the circuit formed by the rest of the lines 19, 20, 21 and 22. The heat is fed to the dryer 16. Downstream of the dryer 16, by means of the line 20, the mixture is routed through a condenser 23 and then fed to the heat exchanger 10' again by means of a pump 24.

It is also possible for the subassemblies made up of the heat exchanger 8', cold compressor 9', heat exchanger 10' and refrigerant pump 25 to be accommodated in a separate cooling module, indicated by the dashed lines designated 26.

In particular for heating up the drying air in the heat exchanger 11 or 11', it is also possible to use further heat sources provided by the printing machine, for example the main drive of the printing machine, the ink-unit temperature control, the waste-air system of the printing machine and the waste air from the dryer system of the printing machine, it being possible for suction extraction to take place here, for example, at individual dryers. It is also possible to use, for example the waste heat from UV stations or infrared stations.

Insofar as the above is based on heat carriers in the form of refrigerant or a water/glycol mixture, it goes without saying that it is also possible to provide the conventional heat-carrier medium—water. If appropriate, this can then be "transformed upward" via a particular heat pump in order to achieve the desired high temperatures.

What is claimed is:

1. A method of supplying suction/compressed air and drying air to a printing machine, vacuum pumps and compressors which are necessary for supplying the suction air/compressed air being disposed together in a room with a separate air supply, comprising the steps of conducting cooling air for the vacuum pumps or compressors substantially in a circuit, wherein heated waste air of the vacuum pumps and the heated cooling air of the vacuum pumps and compressors are cooled in a heat exchanger and used for heating up separate drying air.

2. The method as claimed in claim 1, wherein the waste air is cooled to an extent where, in case of undesirably high air humidity, dehumidification is achieved.

3. The method as claimed in claim 1, wherein the heat extracted from the waste air is transformed to a higher temperature level, in order to heat up the drying air.

4. The method as claimed in claim 3, wherein, transformation is carried out by means of a heat pump.

5. The method as claimed in claim 3, wherein the cooling and transformation is carried out by means of a circulating refrigerant.

6. A method of supplying suction/compressed air and drying air to a printing machine, vacuum pumps and compressors which are necessary for supplying suction air/compressed air being disposed together in a room with a separate air supply, comprising the steps of conducting cooling air for the vacuum pumps or compressors substantially in a circuit, wherein heated waste air of the vacuum pumps and the heated cooling air of the vacuum pumps and compressors are cooled in a heat exchanger, wherein the cooling and transformation is carried out by means of a circulating refrigerant, and wherein the refrigerant is routed via a separate recooler.

7. The method as claimed in claim 1, wherein a reheater is disposed downstream of the heat exchanger heating up the drying air.

8. The method as claimed in claim 1, wherein the drying air at least partially comprises previously dehumidified air.

9. The method as claimed in claim 1, further comprising the step of using further heat sources in particular from a printing process for heating up a drier and/or drier air.

10. An installation for supplying suction air, compressed air and drying air to a printing machine, having a separate room in which subassemblies such as vacuum pumps and compressors are disposed, comprising a set-up for circulating-air operation in the separate room, by a first heat exchanger, connected into the circulating-air operation in the separate room, for cooling the circulating air and by a second heat exchanger outside the separate room, for heating up the drying air, the first and the second heat exchangers being connected to one another via a refrigerant/heat-pump circuit.

11. The installation as claimed in claim 10, wherein a branch to a recooling means is connected between the first and the second heat exchangers.

12. The method as claimed in claim 1, wherein the drying air at least partially comprises previously dehumidified air.

* * * * *